United States Patent
Cai

(10) Patent No.: US 10,064,111 B2
(45) Date of Patent: Aug. 28, 2018

(54) CONFIGURING A DISCARD TIMER

(71) Applicant: BLACKBERRY LIMITED, Waterloo (CA)

(72) Inventor: Zhijun Cai, Asburn, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/348,148

(22) Filed: Nov. 10, 2016

(65) Prior Publication Data

US 2017/0064592 A1 Mar. 2, 2017

Related U.S. Application Data

(63) Continuation of application No. 14/489,956, filed on Sep. 18, 2014, now Pat. No. 9,497,299.

(51) Int. Cl.
| H04W 36/02 | (2009.01) |
| H04L 29/06 | (2006.01) |
| H04L 12/823 | (2013.01) |
| H04W 28/02 | (2009.01) |
| H04L 12/841 | (2013.01) |
| H04L 29/08 | (2006.01) |
| H04W 80/02 | (2009.01) |
| H04W 36/04 | (2009.01) |
| H04W 36/22 | (2009.01) |
| H04W 84/04 | (2009.01) |

(52) U.S. Cl.
CPC ......... *H04W 36/023* (2013.01); *H04L 47/283* (2013.01); *H04L 47/32* (2013.01); *H04L 69/04* (2013.01); *H04L 69/28* (2013.01); *H04L 69/324* (2013.01); *H04W 28/02* (2013.01); *H04W 28/0205* (2013.01); *H04W 36/02* (2013.01); *H04W 80/02* (2013.01); *H04W 36/04* (2013.01); *H04W 36/22* (2013.01); *H04W 84/045* (2013.01)

(58) Field of Classification Search
CPC ......... H04L 69/28; H04L 69/04; H04L 47/32; H04L 47/283; H04L 69/324; H04W 28/02; H04W 36/02; H04W 80/02; H04W 28/0205
See application file for complete search history.

(56) References Cited

U.S. PATENT DOCUMENTS

| 2010/0135202 | A1* | 6/2010 | Chun | H04L 1/1877 370/328 |
| 2012/0294284 | A1 | 11/2012 | Ohta et al. | |
| 2015/0043435 | A1* | 2/2015 | Blankenship | H04L 69/322 370/329 |

(Continued)

OTHER PUBLICATIONS

European Patent Office, Communication pursuant to Article 94(3) EPC for Appl. No. 15185531.9 dated Feb. 3, 2017 (6 pages).

(Continued)

*Primary Examiner* — Steven H Nguyen
(74) *Attorney, Agent, or Firm* — Trop, Pruner & Hu, P.C.

(57) ABSTRACT

A first wireless access network node receives, from a second wireless access network node, delay information relating to a delay in buffering data at a protocol layer in the second wireless access network node. The first wireless access network node configures a discard timer based on the received delay information for a packet to be sent to a user equipment.

20 Claims, 7 Drawing Sheets

(56) References Cited

U.S. PATENT DOCUMENTS

2015/0050940 A1 2/2015 Cai et al.
2015/0085667 A1* 3/2015 Sivanesan ............. H04W 24/04
370/237

OTHER PUBLICATIONS

3GPP TS 36.322 V11.0.0; 3rd Generation Partnership Project; Technical Specification Group Radio Access Network; Evolved Universal Terrestrial Radio Access (E-UTRA); Radio Link Control (RLC) Protocol Specification; Release 12; Sep. 2012; 39 pages.
3GPP TS 36.323 V11.1.0; 3rd Generation Partnership Project; Technical Specification Group Radio Access Network; Evolved Universal Terrestrial Radio Access (E-UTRA); Packet Data Convergence Protocol (PDCP) Specification; Release 11; Dec. 2012; 27 pages.
European Patent Office, Extended European Search Report for EP Appl. No. 15185531.9 dated Jan. 12, 2016 (8 pages).

* cited by examiner

CONFIGURING A DISCARD TIMER

CROSS-REFERENCE TO RELATED APPLICATION

This is a continuation of U.S. application Ser. No. 14/489,956, filed Sep. 18, 2014, which is hereby incorporated by reference in its entirety.

BACKGROUND

As the demand for wireless data communication using wireless user equipments (UEs) has increased, service providers are increasingly facing challenges in meeting capacity demands in regions where the density of users is relatively high. To address capacity issues, heterogeneous networks can be deployed.

A heterogeneous network can include various different types of network nodes, including some combination of the following: macro wireless access network nodes that provide macro cells, pico wireless access network nodes that provide pico cells, femto wireless access network nodes that provide femto cells, and relay nodes. A pico cell refers to a cell that has a relatively small coverage area, such as within a building, a train station, airport, aircraft, or other small areas. A femto cell is a cell that is designed for use in a home or small business. A femto cell is associated with a closed subscriber group (CSG), which specifies that only users within a specific group are allowed to access the femto cell. A relay node is used for relaying data from one wireless entity to another wireless entity.

BRIEF DESCRIPTION OF THE DRAWINGS

Some implementations are described with respect to the following figures.

DETAILED DESCRIPTION

Figure 1:
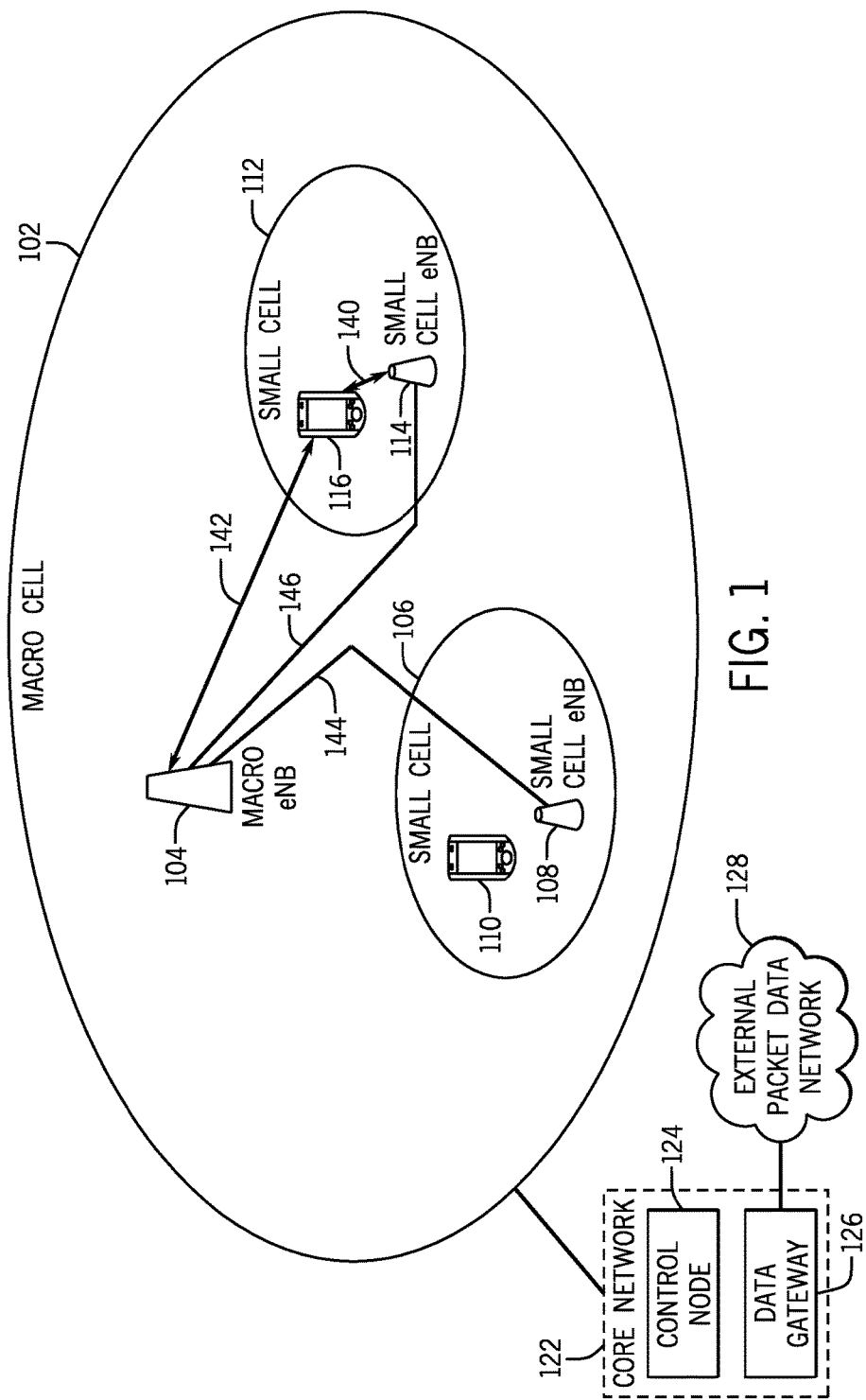
FIG. 1 is a schematic diagram of an example communications network according to some implementations.

An example heterogeneous network arrangement is shown in FIG. 1, which includes a macro cell 102 and various small cells 106, 112 within the coverage area of the macro cell 102. Although just two small cells 106 and 112 are depicted in FIG. 1, it is noted that there can be additional small cells within the coverage area of the macro cell 102. Also, there can be multiple macro cells. The macro cell 102 is provided by a macro wireless access network node 104, while the small cells 106, 112 are provided by respective small cell wireless access network nodes 108, 114.

The small cell wireless access network nodes 108, 114 can include one or more of the following: pico wireless access network nodes, femto wireless access network nodes, and relay nodes. A macro wireless access network node generally is considered a higher power network node, since it is able to transmit wireless signals at a higher power level. Pico wireless access network nodes, femto wireless access network nodes, and relay nodes are generally considered lower power network nodes, since such network nodes transmit signals at a lower power level than the transmissions of the macro wireless access network node.

As depicted in FIG. 1, the macro cell 102 provided by the macro wireless access network node 104 can overlay the coverage areas of the lower power network nodes. In the ensuing discussion, lower power network nodes such as pico wireless access network nodes, femto wireless access network nodes, and relay nodes are referred to as small cell wireless access network nodes. The cells provided by the lower power network nodes are referred to as small cells.

FIG. 1 further depicts user equipments (UEs) 110 and 116. The UE 110 is within the coverage area of the small cell 106, while the UE 116 is within the coverage area of the small cell 112. Note that both UEs 110 and 116 are within the coverage area of the macro cell 102. Although just two UEs are shown in FIG. 1, it is noted that additional UEs can be present in other examples.

A first wireless connection 140 can be established between the UE 116 and the small cell wireless access network node 114. In addition, a second wireless connection 142 can be established between the UE 116 and the macro wireless access network node 104. In such an arrangement, the UE 116 is considered to have established dual concurrent wireless connections with the macro wireless access network node 104 and the small cell wireless access network node 114. In other examples, the UE 116 can establish multiple concurrent wireless connections with the macro wireless access network node 104 and with multiple small cell wireless access network nodes. In some other examples, the UE 116 can establish multiple concurrent wireless connections with multiple macro wireless access network nodes and with multiple small cell wireless access network nodes.

The UE 110 can similarly establish multiple concurrent wireless connections with one or more macro wireless access network nodes and one or more small cell wireless access network nodes.

The UEs 110 and 116 are examples of dual-connection (or more generally, multi-connection) capable UEs that are able to establish dual (or multiple) concurrent connections with the macro wireless access network node 104 and one or more small cell wireless access network nodes. In some cases, a legacy UE may be present, which is not capable of establishing multiple concurrent wireless connections.

FIG. 1 also shows a backhaul link 144 or 146 between the macro wireless access network node 104 and each respective small cell wireless access network node 108 or 114. The backhaul link 144 or 146 can represent a logical communication link between two nodes; the backhaul link can either be a direct point-to-point link or can be routed through another communication network or node. In some implementations, a backhaul link can be a wired link. In other implementations, a backhaul link can include a wireless link.

In some implementations, the macro cell 102 (and more specifically the macro wireless access network node 104) can provide all of the control plane functions on behalf of a UE, while a small cell (more specifically the corresponding small cell wireless access network node) provides at least a portion of the user plane functions for a multi-connection capable UE (a UE that is capable of concurrently connecting to macro and small cells). Note that the macro wireless access network node 104 can also provide user plane functions for the multi-connection capable UE.

Control plane functions involve exchanging certain control signaling between the macro wireless access network node 104 and a UE to perform specified control tasks, such as any or some combination of the following: network attachment of the UE, authentication of the UE, setting up radio bearers for the UE, mobility management to manage mobility of the UE (mobility management includes at least determining which infrastructure network nodes will create, maintain or drop uplink and downlink connections carrying control or user plane information as a UE moves about in a geographic area), performance of a handover decision based on neighbor cell measurements sent by the UE, transmission of a paging message to the UE, broadcasting of system information, control of UE measurement reporting, and so forth. Although examples of control tasks and control messages in a control plane are listed above, it is noted that in other examples, other types of control messages and control tasks can be provided. More generally, the control plane can perform call control and connection control functions, and can provide messaging for setting up calls or connections, supervising calls or connections, and releasing calls or connections.

User plane functions relate to communicating traffic data (e.g. voice data, user data, application data, etc.) between the UE and a wireless access network node. User plane functions can also include exchanging control messages between a wireless access network node and a UE associated with communicating the traffic data, flow control, error recovery, and so forth.

A small cell connection can be added to or removed from a UE under the control of the macro wireless access network node 104. In some implementations, the action of adding or removing a small cell for a UE can be transparent to a core network 122 of the mobile communications network. The core network 122 includes a control node 124 and a data gateway 126. Although just one control node 124 and data gateway 126 is shown in FIG. 1, it is noted that in other examples, multiple control nodes 124 and/or multiple data gateways 126 can be provided.

The data gateway 126 can be coupled to an external packet data network (PDN) 128, such as the Internet, a local area network (LAN), a wide area network (WAN), and so forth. FIG. 1 depicts the macro wireless network node 104 connected to the control node 124 and data gateway 126 of the core network 118. Although not shown, it is noted that the small cell wireless access network nodes can also be connected to the core network nodes.

Note that a legacy UE (a UE that is not capable of establishing multiple concurrent wireless connections with a macro cell and one or more small cells) can connect to either a macro cell or a small cell using standard wireless connection techniques.

When a UE moves under the coverage of a small cell, the macro wireless access network node 104 may decide to offload some of the user plane traffic to the small cell. This offload is referred to as data offload. When data offload has been performed from the macro cell 104 to the small cell, then a UE that has a dual connection can transmit or receive data to and from the corresponding small cell wireless access network node. Additionally, the UE may also communicate user plane traffic with the macro wireless access network node 104. Although reference is made to data offload to one small cell, it is noted that in other examples, the macro cell 104 can perform data offload for the UE to multiple small cells.

In some examples, the data offload causes the offloaded data to be communicated between the macro wireless access network node 104 and the respective small cell wireless access network node 108 or 114 over the respective backhaul link 144 or 146.

In the ensuing discussion, reference is made to a dual-connection capable UE, which is a UE that is capable of establishing dual concurrent connections with the macro wireless access network node 104 and a small cell wireless access network node. It is noted that techniques or mechanisms according to some implementations can be extended to scenarios where a UE has established more than two concurrent connections with the macro wireless access network node 104 and multiple small cell wireless access network nodes.

In the dual connection scenario (where a UE has established dual concurrent connections with the macro wireless access network node 104 and a small cell wireless access network node), user plane data can be communicated over the wireless connection between the small cell wireless access network node and the UE. In the downlink direction, user plane data can be sent from the macro wireless access network node 104 to the small cell wireless access network node over the respective backhaul link, and the small cell wireless access network node can in turn send the downlink user plane data to the UE. It is noted that the macro wireless access network node 104 can also send downlink user plane data to the UE over the wireless connection between the macro wireless access network node 104 and the UE.

Various protocol layers are provided in the macro wireless access network node 104 and each small cell wireless access network node to perform communications in the user plane. These protocol layers include a Packet Data Convergence Protocol (PDCP) layer as well as other lower protocol layers. Additional details regarding the PDCP layer and other protocol layers are discussed further below.

The PDCP layer can be associated with a discard timer for data units (also referred to as "packets") that are communicated by the PDCP layer. Note that the data units can be uplink data units (data units sent from the UE to a wireless access network node) or downlink data units (data units sent from a wireless access network node to a UE).

When the PDCP layer receives a data unit (referred to as a Service Data Unit, SDU) to be transmitted, the SDU is placed in a PDCP buffer, and a discard timer associated with the SDU is started. The discard timer continues to run so long as confirmation is not received by the PDCP layer regarding successful delivery of the PDCP SDU. Upon expiration of the discard timer, the SDU is discarded from the PDCP buffer, along with the corresponding PDCP Protocol Data Unit (PDU). Note that the SDU is received by the PDCP layer, while the PDU is the data unit sent by the PDCP layer that includes content of the SDU. The SDU is received by the PDCP layer from a higher protocol layer, while the PDU is sent by the PDCP layer to a lower protocol layer. If the PDCP PDU has already been sent to a lower protocol layer by the PDCP layer, the PDCP layer can also send a discard indication to the lower protocol layer to cause the lower protocol layer to discard the corresponding PDU.

Note that the PDCP SDU is also discarded from the PDCP buffer upon receipt of a PDCP status report by the PDCP layer of successful delivery of the PDCP SDU.

In a single connection scenario where a UE has established a wireless connection with just one wireless access network node, such as the macro wireless access network node 104, the PDCP layer and lower protocol layers reside in the same wireless access network node. In such a scenario, operation of the discard timer can proceed according to the normal procedure as defined by the relevant specifications.

However, in scenarios where a UE has dual concurrent connections with the macro wireless access network node and a small cell wireless access network node, then the PDCP layer may reside in the macro wireless access network node, while lower protocol layers that interact with the PDCP layer can reside in both the macro wireless access network node and the small cell wireless access network node. The discard timer procedure for the dual connection scenarios becomes more complicated.

In accordance with some implementations, techniques or mechanisms provide a discard timer procedure in scenarios where a UE has dual concurrent connections (or more generally, multiple concurrent connections) with multiple wireless access network nodes. As discussed further below, in some implementations, one discard timer can be provided in the macro wireless access network node 104, while another discard timer is provided in the small cell wireless access network node. In such implementations, it can be challenging to configure the discard timer of the small cell wireless access network node with an appropriate value that defines the discard time interval. As discussed further below, information can be provided by the macro wireless access network node 104 to the small cell wireless access network node to configure the discard timer in the small cell wireless access network node with an appropriate value.

In other implementations, the discard timers for both data units transmitted by the wireless access network node 104 and the small cell wireless access node are deployed at the wireless access network node 104. The multiple discard timers at the macro wireless access network node include a macro cell discard timer (for data units sent by the PDCP layer to a lower protocol layer in the macro wireless access network node 104) and at least one small cell discard timer (for data units sent by the PDCP layer to a lower protocol layer in the small cell wireless access network node).

Upon expiration of the small cell discard timer in the macro wireless access network node 104, a discard indication is sent by the macro wireless access network node to the small cell wireless access network node, to cause discarding of the corresponding PDCP PDU at the small cell wireless access network node. However, due to latency of the backhaul link between the macro wireless access network node 104 and the small cell wireless access network node, the discard indication may cause the wrong PDCP PDU to be discarded at the small cell wireless access network node. Accordingly, in accordance with some implementations, specific identifiers (discussed further below) are included in the discard indication to ensure that the correct PDCP PDU is discarded.

In the ensuing discussion, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards.

Although reference is made to E-UTRA in the ensuing discussion, it is noted that techniques or mechanisms according to some implementations can be applied to other wireless access technologies, such as 5G (fifth generation) wireless access technologies, 6G wireless access technologies, wireless local area network (WLAN) technologies (e.g. as provided by IEEE 802.11), and so forth.

In an E-UTRA network, a wireless access network node can be implemented as an enhanced Node B (eNB), which includes functionalities of a base station and base station controller. Thus, in an E-UTRA network, a macro wireless access network node is referred to as a macro eNB (e.g. 104 in FIG. 1). In an E-UTRA network, small cell wireless access network nodes can be referred to as small cell eNBs (e.g. 108 and 114 in FIG. 1).

In an E-UTRA network, the control node 124 in the core network 122 can be implemented as a mobility management entity (MME). An MME is a control node for performing various control tasks associated with an E-UTRA network. For example, the MME can perform idle mode UE tracking and paging, bearer activation and deactivation, selection of a serving gateway (discussed further below) when the UE initially attaches to the E-UTRA network, handover of the UE between macro eNBs, authentication of a user, generation and allocation of a temporary identity to a UE, and so forth. In other examples, the MME can perform other or alternative tasks.

In an E-UTRA network, the data gateway 126 of the core network 122 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN 124. The PDN-GW is the entry and egress point for data communicated between a UE in the E-UTRA network and a network element coupled to the PDN 128. Note that there can be multiple PDNs and corresponding PDN-GWs. Moreover, there can be multiple MMEs and SGWs.

Figure 2:
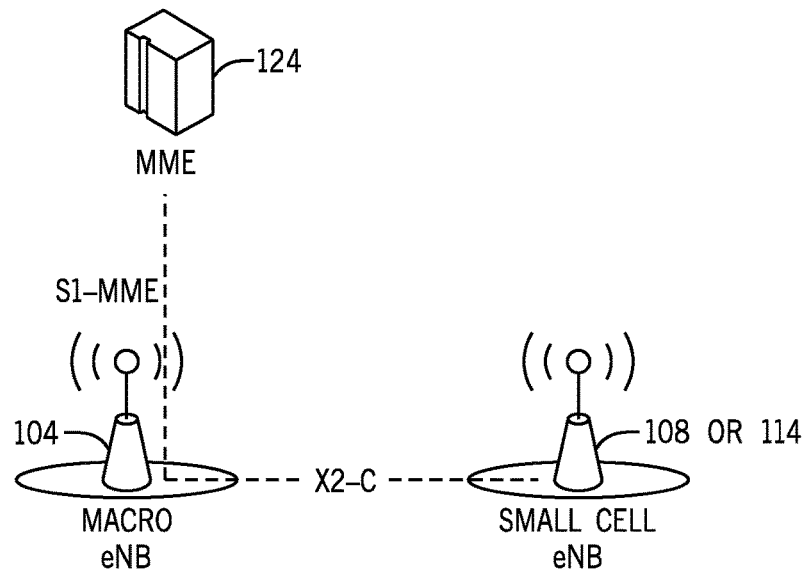
FIGS. 2 and 3 are schematic diagrams of connectivity among various network nodes, according to some examples.
Figure 3:
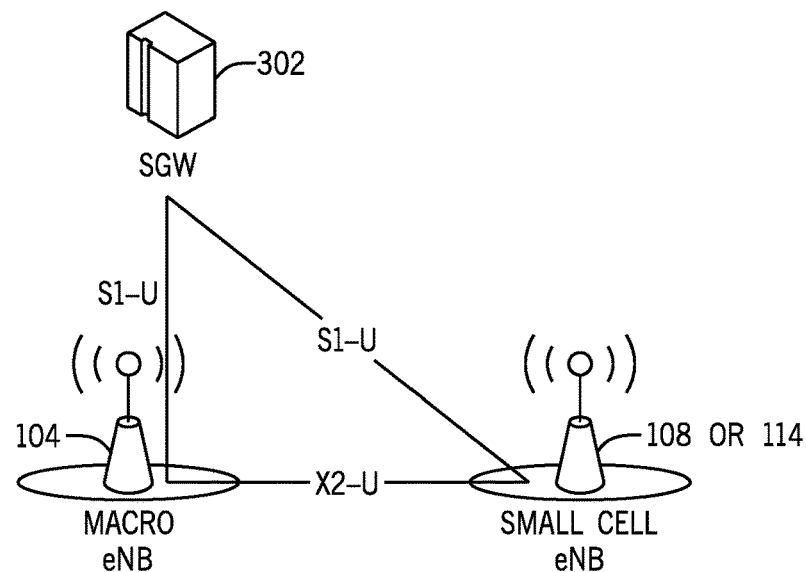

FIG. 2 shows the control plane connectivity among the macro eNB 104, small cell eNB 108 or 114, and the MME 124. FIG. 3 shows the user plane connectivity among the macro eNB 104, small cell eNB 108 or 114, and an SGW 302 (which corresponds to the data gateway 126 of FIG. 1).

As shown in FIG. 2, inter-eNB control plane signaling (signaling between the macro eNB 104 and the small cell eNB 108 or 114) for dual connectivity is performed using messaging over an X2 interface (more specifically the X2-C interface) as provided by the E-UTRA standards. Control plane signaling between the macro eNB 104 and the MME 124 is performed over an S1-MME interface, as provided by the E-UTRA standards. Coordination between the macro eNB 104 and small cell eNB 108 or 114 is performed using X2-C interface signaling.

FIG. 3 depicts the user plane connectivity among the SGW 302. The connection between the macro eNB 104 and the SGW 302 is over an S1-U interface, as provided by the E-UTRA standards. The connection between the macro eNB 104 and the small cell eNB 108 or 114 is over an X2-U interface, as provided by the E-UTRA standards.

There are three possible bearer options for user plane data communications. A first bearer option is a Master Cell Group (MCG) bearer option. A "bearer" can refer to a radio access bearer, such as an E-UTRAN (Evolved Universal Terrestrial Radio Access Network) Radio Access Bearer (E-RAB), which is used to transport data between a UE and a core network node, such as the SGW 302. A data radio bearer (DRB) is used to transport the data of the E-RAB between a UE and an eNB. Reference to offloading a radio access bearer can refer to either offloading a given E-RAB or the corresponding DRB.

With the MCG bearer option, user plane data is communicated between the macro eNB 104 and the SGW 302 over the S1-U interface, and between the macro eNB 104 and the UE over the respective wireless connection. A small cell eNB is not involved in the transport of user plane data with the MCG bearer option.

A second bearer option is a split bearer option, in which user plane data is communicated between the macro eNB 104 and the SGW 302 over the S1-U interface. In addition, user plane data is also carried over the X2-U interface between the macro eNB 104 and the small cell eNB 108 or 114. A portion of the user plane data can be communicated between the small cell eNB and the UE, while another portion of the user plane data can be communicated between the macro eNB and the UE. In both the downlink and uplink directions, user plane data communicated by the small cell eNB with the UE passes over the X2-U connection between the macro eNB 104 and the small cell eNB.

A third bearer option is a Secondary Cell Group (SCG) bearer option, in which user plane data is carried between the small cell eNB 108 or 114 and the SGW 302 directly over an S1-U interface (as shown in FIG. 3), without passing over the X2-U interface between the small cell eNB 108 or 114 and the macro eNB 104.

The discard timer solutions discussed in the present disclosure can be used with the split bearer option discussed above. Note however, that the discard timer solutions discussed in the present disclosure can also be applied in other contexts.

Figure 4:
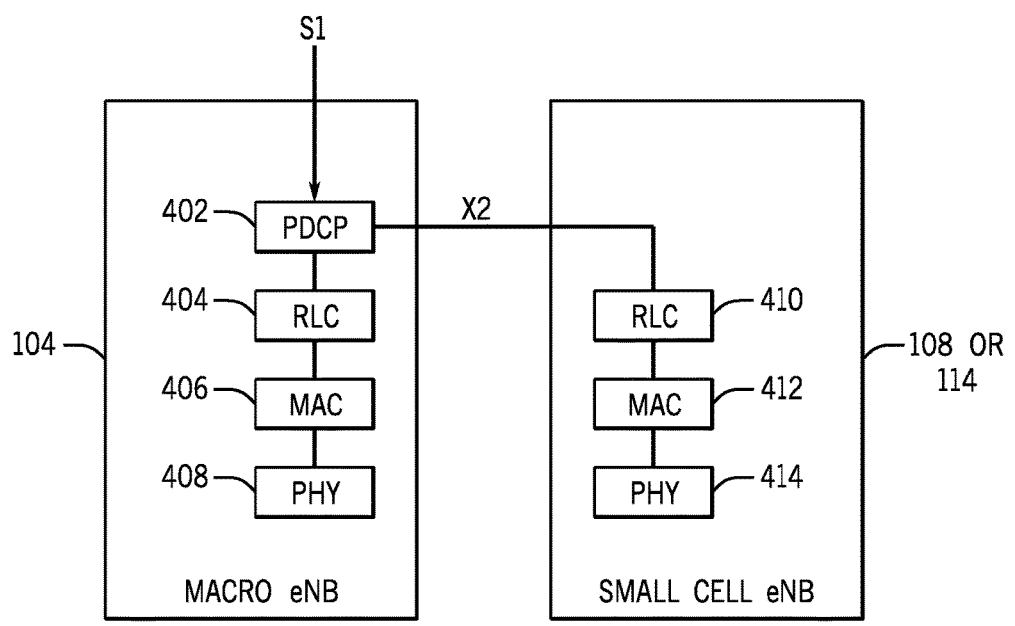
FIG. 4 is a block diagram of protocol stacks in a macro wireless access network node and a small cell wireless access network node, according to some examples.

FIG. 4 is a schematic diagram of user plane protocol stacks in the macro eNB 104 and the small cell eNB 108 or 114. In the macro eNB 104, the user plane protocol stack can include the following protocol layers: a PDCP layer 402, a Radio Link Control (RLC) layer 404, a Medium Access Control (MAC) layer 406, and a physical (PHY) layer 408.

Depending on where the user plane protocol stack split occurs, at least some of these protocol layers can be included in the small cell eNB 108 or 114. Splitting a user plane protocol stack at a given point results in multiple user plane paths, with one user plane path through the macro eNB 104 and another user plane path through the small cell eNB.

Distribution of user plane data along the different user plane paths can involve data distribution at the radio bearer (RB) level. Thus, for example, data of some data radio bearers (DRBs) can be communicated over the user plane path through the small cell eNB 108 or 114, while data of other DRBs can be communicated over the user plane path through the macro eNB 104. Communicating data of some DRBs over a user plane path that extends through a small cell eNB can be referred to as offloading the data of such DRBs from the macro eNB to the small cell eNB.

Assuming the split occurs after the PDCP layer 402, the protocol stack of the small cell eNB 108 or 114 can include an RLC layer 410, a MAC layer 412, and a PHY layer 414. A split of user plane protocol stack at another point can result in different protocol layers provided in the small cell eNB.

Note that there can be other protocol layers in the macro eNB 104 and the small cell eNB 108 or 114 that are not shown in FIG. 4. Note also that similar protocol layers are also present in a UE.

The physical layer 408 or 414 is the lowest layer in the corresponding node. The physical layer 408 or 414 can include networking hardware for transmitting signals over a wireless link. The MAC layer 406 or 412 provides addressing and channel access control mechanisms.

The RLC layer 404 or 410 can provide at least some of the following example functionalities, as described in 3GPP TS 36.322:

transfer of upper layer PDUs (from the PDCP layer 402);
error correction, such as by using Automatic Repeat reQuest (ARQ);
concatenation, segmentation, and reassembly of RLC SDUs;
reordering of RLC data PDUs;
duplicate data detection;
discarding of an RLC SDU;
RLC re-establishment; and
protocol error detection.

The PDCP layer 402 can provide at least some of the following functionalities in the user plane, as described in 3GPP TS 36.323:

header compression and decompression;
transfer of user data;
in-sequence delivery of upper layer PDUs;
duplicate detection of lower layer SDUs;
retransmission of PDCP SDUs;
ciphering and deciphering; and
timer-based SDU discard.

Providing Small Cell Discard Timer in Small Cell eNB

As discussed above, in accordance with some implementations, discard timers are deployed in both the macro eNB 104 and the small cell eNB. The discard timer in the small cell eNB can be referred to as a "small cell discard timer," while the discard timer in the macro eNB can be referred to as a "macro cell discard timer."

Figure 5:
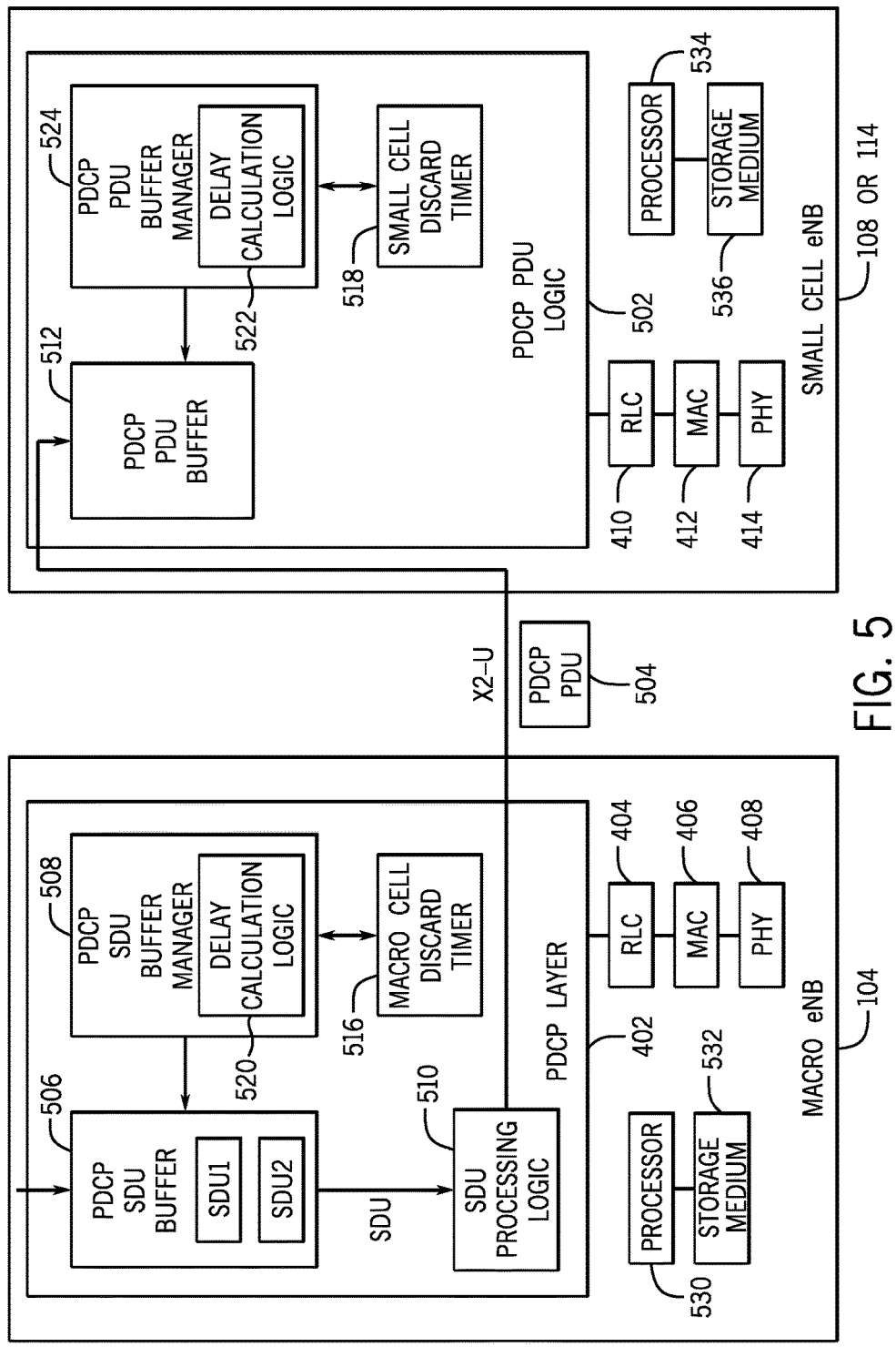
FIG. 5 is block diagram of components in a macro wireless access network node and a small cell wireless access network node, according to some implementations.

FIG. 5 shows further details of components of the PDCP layer 402 in the macro eNB 104, as well as components of a PDCP PDU logic 502 in the small cell eNB 108 or 114. The PDCP PDU logic 502 is included in the small cell eNB for managing PDCP PDUs (such as PDU 504) received over the X2-U interface from the macro eNB 104.

It is noted that FIG. 5 depicts an operation for communication of downlink data (data received from the core network 122 of FIG. 1 and passed through the macro eNB 104 and possibly the small cell eNB 108 or 114 to the UE).

The PDCP layer 402 in the macro eNB 104 includes a PDCP SDU buffer 506, for storing PDCP SDUs (SDU1 and SDU2 depicted in the example of FIG. 5) received from a higher protocol layer, which can be in a separate node, such as the SGW 302 shown in FIG. 3. The PDCP layer 402 also includes a PDCP SDU buffer manager 508, for managing the PDCP SDU buffer 506.

The PDCP layer 402 also includes an SDU processing logic 510, for processing each SDU in the PDCP SDU buffer 506. As examples, the SDU processing logic 510 can perform header compression and also can add a PDCP header, to form a PDCP PDU that is transmitted by the PDCP layer 402 to a lower protocol layer, which can be either the RLC layer 404 in the macro eNB 104 or the RLC layer 410 in the small cell eNB.

In the example of FIG. 5, a PDCP PDU 504 is shown as being sent from the PDCP layer 402 to the small cell eNB. In accordance with some implementations, a PDCP PDU received from the macro eNB 104 is stored in a PDCP PDU buffer 512 in a PDCP PDU buffer manager 524. The PDCP PDU buffer 512 and the PDCP PDU buffer manager 524 are both part of the PDCP PDU logic 502 in the small cell eNB. The PDCP PDU buffer manager 524 manages PDCP PDUs in the PDCP PDU buffer 512.

In some implementations, for an acknowledged data transfer service, the PDCP layer 402 expects to receive an indication of successful delivery of PDCP PDUs from an RLC layer, which can include the RLC layer 404 in the macro eNB 104 or the RLC layer 410 in the small cell eNB, depending on which data path the respective PDU was sent. Such acknowledged data transfer service is described in 3GPP TS 36.323, for example.

Any unacknowledged PDCP SDU is kept in the PDCP SDU buffer 506. For a first PDCP SDU (SDU1 in FIG. 5) that is transmitted to the RLC layer 404 in the macro eNB 104, a macro cell discard timer 516 is associated with SDU1. For a second PDCP SDU (SDU2 in FIG. 5) that is transmitted to the RLC layer 410 in the small cell eNB, a small cell discard timer 518 (which is part of the PDCP PDU logic 502 of the small cell eNB) is associated with the SDU2.

Note that each PDCP SDU in the PDCP SDU buffer is associated with a respective discard timer, either a macro cell discard timer or a small cell discard timer, depending on which path the respective PDCP SDU is to be transmitted on.

For SDU1 associated with the macro cell discard timer 516, if the macro cell discard timer 516 expires, then SDU1 is removed from the PDCP SDU buffer 506 and discarded. If SDU1 or part of SDU1 is already delivered to the RLC layer 404 in the macro eNB 104, the corresponding PDU in the RLC layer will be removed. However, for SDU2 that is sent to the RLC layer 410 in the small cell eNB, the discarding of SDU2 is based on expiration of the small cell discard timer 518.

If the small cell discard timer 518 expires, then the respective PDCP PDU is removed from the PDCP PDU buffer 512 by the PDCP PDU buffer manager 524. In addition, the PDCP PDU buffer manager 524 sends a discard indication to the macro eNB 104, where this discard indication can indicate expiration of the small cell discard timer 518 or can indicate discarding of a respective PDCP PDU. This discard indication can be included in a PDCP PDU status report, for example, or can be included in some other message sent by the small cell eNB to the macro eNB 104.

As an example, the PDCP status report can indicate a sequence number of a discarded PDCP PDU in the small cell eNB due to expiration of the small cell discard timer 518. Note that the PDCP status report can include multiple sequence numbers of multiple discarded PDCP PDUs due to expiration of respective small cell discard timers 518.

In response to receiving the discard indication from the PDCP PDU buffer manager 524, the PDCP SDU buffer manager 508 removes the corresponding SDU2 from the PDCP SDU buffer 506 and discards SDU2.

The PDCP PDU buffer manager 524 keeps a PDCP PDU in the PDCP PDU buffer 512 so long as the PDCP PDU buffer manager 524 has not received an indication from the RLC layer 410 of successful delivery of the PDCP PDU. In response to an indication of successful delivery of a PDCP PDU, the PDCP PDU buffer manager 524 resets the small cell discard timer 518 and also removes the PDCP PDU from the PDCP PDU buffer 512. However, if the RLC layer 410 does not provide an indication of successful delivery of the PDCP PDU, then the small cell discard timer 518 expires after some specified amount of time. Note that each PDCP PDU in the PDCP PDU buffer 512 is associated with a respective different small cell discard timer 518 that is started with receipt of each respective PDCP PDU.

Configuration of the small cell discard timer 518 for each respective PDCP PDU is based on various delays that can be experienced by traversal of user plane data corresponding to the PDCP PDU through the macro eNB 104, the X2-U interface, and through the small cell eNB. In some examples, the overall delivery time for a PDCP SDU over a split bearer (that includes the macro eNB 104 and the small cell eNB) is based on an aggregation of the following three delays: (1) a buffering delay in the PDCP layer 402 of the macro eNB 104, including delay in buffering the PDCP SDU in the PDCP SDU buffer 506, (2) a delivery delay over the X2-U interface, and (3) a buffering delay through the PDCP PDU buffer 512 and the RLC and MAC layers 410 and 412 (and/or other protocol layers) in the small cell eNB.

If the small cell discard timer 518 is not configured properly to account for the various delays of the overall delivery time of a PDCP SDU, then the small cell discard timer 518 may not accurately track the amount of time involved in delivering user plane data of the PDCP SDU. In some cases, the small cell discard timer 518 may be set to track too short a time interval. In other cases, the small cell discard timer 518 may be configured to track too long a time interval.

It is noted that the small cell eNB is not aware of the buffering delay in the PDCP layer 402 in the macro eNB 104. In accordance with some implementations, the macro eNB 104 (and more specifically, the PDCP SDU buffer manager 508 or a different entity) can send an indication of the buffering delay in the PDCP layer 402 to the small cell eNB (and more specifically, to the PDCP PDU buffer manager 524 or another entity in the small cell eNB). The PDCP PDU buffer manager 524 (or another entity) configures the small cell discard timer 518, using the buffering delay of the PDCP layer 402 sent by the macro eNB 104, and further using delay information relating to delivery delay over the X2-U interface and the buffering delay in the small cell eNB.

Note that the delivery delay over the X2-U interface (referred to as a "backhaul delay") can be variable depending on the traffic load of the X2-U interface and the bandwidth of the X2-U interface. In some implementations, whenever the PDCP layer 402 of the macro eNB 104 sends a PDCP PDU over the X2-U interface, the macro eNB 104 can include a transmission timestamp of the PDCP PDU. Upon receipt of the PDCP PDU with the transmission timestamp, the small cell eNB can determine the backhaul delay for each individual PDCP PDU over the X2-U interface, by subtracting the timestamp corresponding to when the PDCP PDU was received by the small cell eNB from the transmission timestamp. In such examples, the small cell eNB is able to determine the specific backhaul delay for each individual PDCP PDU, and can configure the respective small cell discard timer 518 accordingly. Different PDCP PDUs may be associated with different backhaul delays over the X2-U interface, in which case the respective small cell discard timers 518 can be configured differently to account for these different backhaul delays over the X2-U interface.

In other implementations, instead of computing the backhaul delay for each individual PDCP PDU, an average of the backhaul delays can be computed, by computing an average (or some other aggregate) of the backhaul delays experienced by multiple PDCP PDUs. The average backhaul delay can be estimated by a delay calculation logic 520 in the PDCP layer 402 of the macro eNB 104. Alternatively, the average backhaul delay can be calculated by a delay calculation logic 522 in the PDCP PDU control logic 502 of the small cell eNB.

Configuring the small cell discard timer 518 can refer to setting the small cell discard timer 518 to count or track a specified period of time. This specified period of time can be based on summing the buffering delay of the PDCP layer 402, the backhaul delivery delay, and the buffering delay in the small cell eNB. In other examples, other aggregations of the buffering delay in the PDCP layer 402, the backhaul deliver delay, and the buffering delay in a small cell eNB can be used for determining the specified amount of time to be tracked or counted by the small cell discard timer 518.

Figure 6:
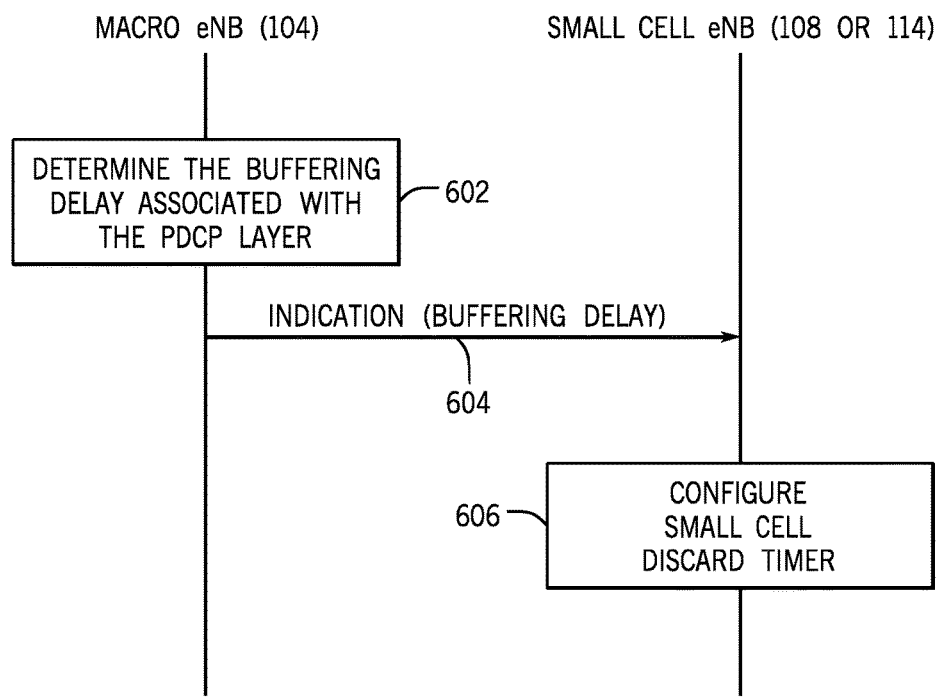
FIG. 6 is a message flow diagram of a process according to some implementations.

FIG. 6 is a message flow diagram according to some implementations. The macro eNB 104 determines (at 602) the buffering delay associated with the PDCP layer 402. In some examples, when a given SDU is received at the PDCP layer 402, a timer is started to track the buffering delay in the PDCP SDU buffer 506. At the time that a given SDU is delivered to the small cell eNB, the corresponding timer value is the buffering delay of the given SDU in the PDCP SDU buffer 506. In other examples, other techniques may be used to determine the buffering delay of an SDU in the PDCP SDU buffer 506.

The macro eNB 104 can then send (at 604) an indication to the small cell eNB of the PDCP buffering delay, for each PDCP PDU delivered by the macro eNB 104 to the small cell eNB. The buffering delay indication can be included in a message that is sent from the macro eNB 104 to the small cell eNB. The PDCP buffering delay can be indicated as an absolute time value (e.g. a specific amount of time of the buffering delay), or as an index that can be set to multiple different values. The different values of the index can represent different ranges of PDCP buffering delays. For example, a first value of the index represents a delay in a first range (e.g. less than 10 milliseconds or ms), a second value of the index represents a delay in a second range (e.g. 10 ms to 20 ms), and a third value of the index represents a delay in a third range (e.g. greater than 20 ms).

In response to the indication of the PDCP buffering delay received from the macro eNB 104, the small cell eNB configures (at 606) a respective small cell discard timer 518 in the small cell eNB, as discussed above.

Providing Small Cell Discard Timer in Macro eNB

Figure 7:
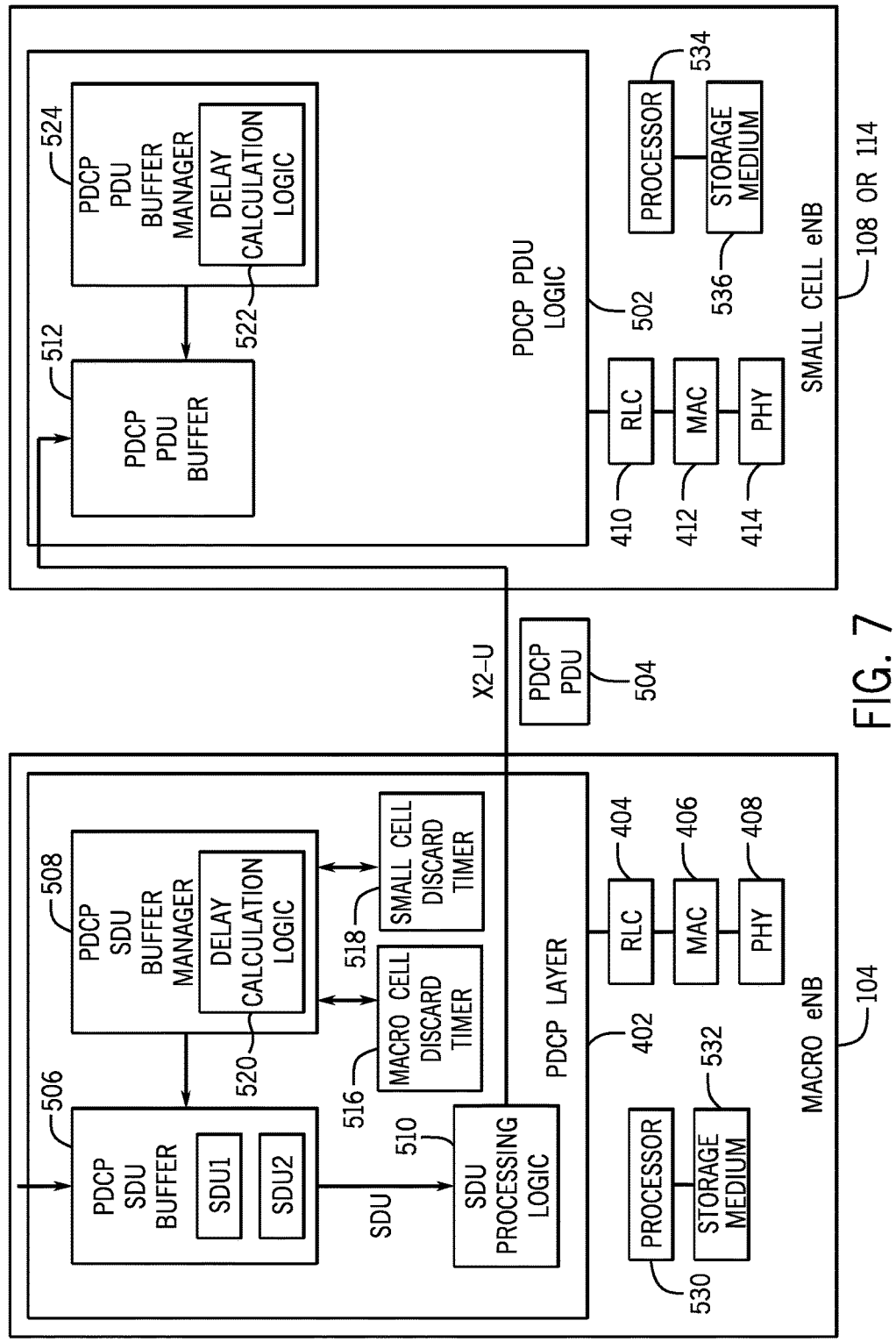
FIG. 7 is block diagram of components in a macro wireless access network node and a small cell wireless access network node, according to further implementations.

Instead of providing the small cell discard timer 518 in the small cell eNB as depicted in FIG. 5, the small cell discard timer 518, as well as the macro cell discard timer 516, can both be provided in the macro eNB 104, as shown in FIG. 7. In the FIG. 7 implementation, the small cell eNB does not include any small cell discard timer.

The macro cell discard timer 516 is used for a first PDCP PDU communicated via the macro eNB 104 to the UE, and the small cell discard timer 518 is used for a second PDCP PDU communicated via the small cell eNB. When the small cell discard timer 518 expires for a particular PDCP SDU, the PDCP SDU buffer manager 508 removes the particular PDCP SDU from the PDCP SDU buffer 506, and also causes removal of the corresponding PDCP PDU from the PDCP PDU buffer 512 in the small cell eNB. To remove the corresponding PDCP PDU from the PDCP PDU buffer 512 in the small cell eNB, the macro eNB 104 sends a discard indication to the PDCP PDU buffer manager 524 in the small cell eNB to clear the corresponding PDCP PDU (to cause removal of the corresponding PDCP PDU from the PDCP PDU buffer 512 in the small cell eNB).

The discard indication sent by the macro eNB 104 includes an identifier of the particular PDCP PDU to be discarded. This identifier can include a sequence number of the PDCP PDU, which incrementally increases as PDCP PDUs are successively sent by the macro eNB 104 to the small cell eNB.

Note that the sequence number of a PDCP PDU is represented as a number of bits. PDCP PDUs can be carried in a hyperframe (or some other data structure). Due to the finite number of bits (e.g. five bits or some other number of bits) used to represent the PDU sequence number, any given sequence number can be re-used in different hyperframes.

Due to the backhaul delay over the X2 interface between the macro eNB 104 and the small cell eNB, the discard indication sent by the macro eNB 104 may experience some amount of delay. As an example, the macro eNB 104 may send the discard indication that includes a sequence number SN=Y for a PDCP PDU in hyperframe X, which should trigger discarding of the PDCP PDU with SN=Y in hyperframe X. However, due to the backhaul delay over the X2 interface, the discard indication may arrive at the small cell eNB late, at which time the small cell eNB may already be communicating PDCP PDUs in hyperframe X+1. Receipt of the late discard indication may cause discarding of the PDCP PDU with SN=Y In hyperframe X+1, rather than the intended discarding of the PDCP PDU with SN=Y in hyperframe X.

To avoid the discarding of an incorrect PDCP PDU at the small cell eNB due to late arrival of a discard indication, the discard indication can be configured to further include an identifier of the hyperframe (e.g. hyperframe number or HFN) in addition to the PDU sequence number.

Inclusion of both the HFN and the sequence number of the PDCP PDU to be discarded allows the small cell eNB to identify the correct PDCP PDU to discard. Discarding the incorrect PDCP PDU may result in reduced system throughput or errors.

In some implementations, the discard indication sent by the macro eNB 104 to the small cell eNB can be in an SCG-ConfigInfo information element, as provided by 3GPP TS 36.300 and 36.331. The SCG-ConfigInfo information element can be included in an X2-AP: SeNBModificationRequest message, and is used to deliver radio resource control information from a macro cell to a small cell.

Figure 8:
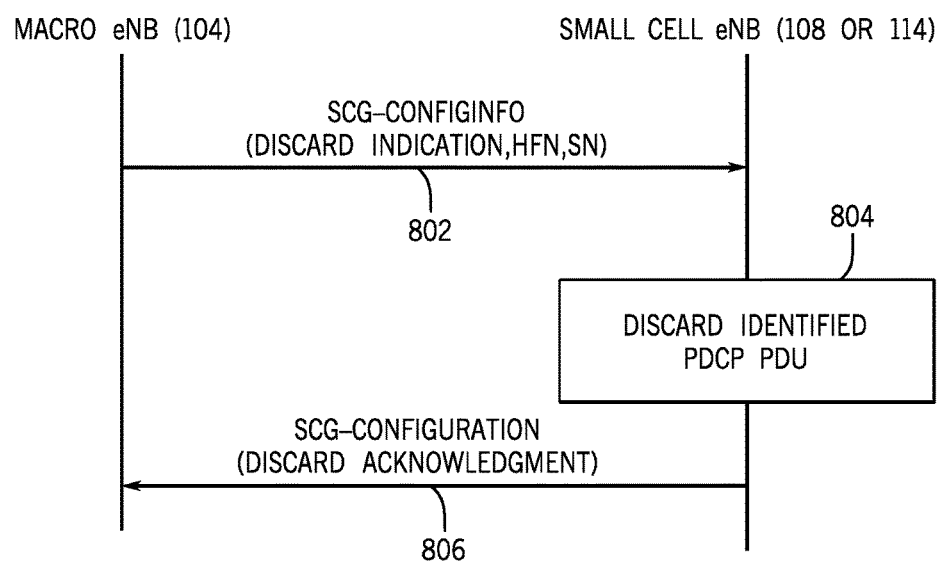
FIG. 8 is a message flow diagram of a process according to some implementations.

FIG. 8 is a message flow diagram of a process according to some implementations. The macro eNB 104 sends (at 802) an SCG-ConfigInfo information element to the small cell eNB, where the SCG-ConfigInfo information element carries a discard indication that includes an HFN and SN of a PDCP PDU to be discarded by the small cell eNB.

In response to the received discard indication, the small cell eNB removes (at 804) the identified PDCP PDU (based on the HFN and SN in the discard indication) from the PDCP PDU buffer 512 (FIG. 7), and discards the PDCP PDU.

The small cell eNB sends (at 806) an acknowledgment of the discard indication back to the macro eNB 104. The acknowledgment can be carried in an SCG-Configuration information element included in the X2-AP: SeNBModificationRequest message.

Note that when the small cell eNB sends back a PDCP PDU status report, the status report does not have to include SNs of the discarded PDU, since macro eNB 104 already has the information.

In general, according to some implementations, a macro wireless access network node sends an SCG-ConfigInfo information element to a small cell wireless access network node, where the SCG-ConfigInfo information element includes a discard indication that identifies a data unit to discard.

In further implementations, the discard indication can identify a specific data unit to be discarded by including an identifier of a data structure carrying data units, and a sequence number of the specific data unit.

In further implementations, the data structure carrying data units can be a hyperframe, and the identifier of the hyperframe can be a hyperframe number.

Computer Architecture

The various tasks discussed above can be performed by machine-readable instructions that can be executed on one or multiple processors, such as processor(s) 530 (FIG. 5 or 7) in the macro eNB 104, or processor(s) 534 in the small cell eNB. A processor can include a microprocessor, microcontroller, processor module or subsystem, programmable integrated circuit, programmable gate array, or another control or computing device.

The machine-readable instructions can be stored in non-transitory machine-readable or computer-readable storage media, such as storage medium (or storage media) 532 (FIG. 5 or 7) in the macro eNB 104, or storage medium (or storage media) 536 in the small cell eNB.

The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a first wireless access network node from a second wireless access network node, delay information relating to a delay in buffering data at a protocol layer in the second wireless access network node; and
   configuring, by the first wireless access network node, a discard timer based on the received delay information for a packet to be sent to a user equipment.

2. The method of claim 1, wherein the protocol layer is a packet data convergence protocol (PDCP) layer, and the received delay information relates to a delay in buffering a PDCP service data unit (SDU) at the PDCP layer.

3. The method of claim 2, wherein configuring the discard timer for the packet comprises configuring the discard timer for a PDCP protocol data unit (PDU).

4. The method of claim 1, wherein configuring the discard timer comprises configuring the discard timer to count a specified length of time based on the received delay information.

5. The method of claim 1, wherein configuring the discard timer comprises configuring the discard timer to count a specified length of time based on the received delay information, a delay associated with communication over a link between the first and second wireless access network nodes, and a delay of buffering the packet at the first wireless access network node.

6. The method of claim 5, wherein the delay associated with communication over the link between the first and second wireless access network nodes comprises a measured delay for the packet.

7. The method of claim 6, wherein the measured delay is measured by one of the first and second wireless access network nodes.

8. The method of claim 5, wherein the delay associated with communication over the link between the first and second wireless access network nodes comprises an average delay for packets communicated over the link.

9. The method of claim 1, further comprising:
   receiving, by the first wireless access network node over a link from the second wireless access network node, further delay information, the further delay information indicating a delay of communication over the link, wherein configuring the discard timer is based additionally on the further delay information.

10. The method of claim 1, further comprising:
    starting, by the first wireless access network node, the discard timer in response to receipt of the packet from the second wireless access network node.

11. The method of claim 10, further comprising:
    in response to expiration of the discard timer, discarding the packet.

12. The method of claim 10, further comprising:
    in response to receiving an indication of successful delivery of the packet, resetting the discard timer.

13. The method of claim 1, wherein receiving the delay information comprises receiving the delay information as an absolute time of the delay.

14. The method of claim 1, wherein receiving the delay information comprises receiving the delay information as an index settable to a plurality of values that represent respective delay ranges.

15. A first wireless access network node comprising:
    a protocol layer;
    a network interface to communicate with a second wireless access network node over a link; and
    at least one processor, wherein the protocol layer comprises machine-readable instructions executable on the at least one processor, and the at least one processor is configured to:
       send, over the link to the second wireless access network node, delay information pertaining to buffering of data at the protocol layer of the first wireless access network node, wherein sending the delay information is to cause configuring of a discard timer at the second wireless access network node based on the delay information.

16. The first wireless access network node of claim 15, wherein the protocol layer is a packet data convergence protocol (PDCP) layer, and the delay information relates to a delay in buffering a PDCP service data unit (SDU) at the PDCP layer.

17. The first wireless access network node of claim 16, wherein the PDCP layer is executable on the at least one processor to receive the PDCP SDU from a higher protocol layer, and to send a PDCP protocol data unit (PDU) corresponding to the PDCP SDU to a lower level protocol layer in the second wireless access network node.

18. The first wireless access network node of claim 15, wherein the at least one processor is configured to further send, over the link to the second wireless access network node, further delay information of communication over the link, wherein the further delay information is to cause the second wireless access network node to configure the discard timer based further on the further delay information.

19. A first wireless access network node comprising:
a discard timer;
a network interface to communicate with a second wireless access network node over a link; and
at least one processor configured to:
   receive, from the second wireless access network node, delay information relating to a delay in buffering data at a protocol layer in the second wireless access network node; and
   configure the discard timer based on the received delay information for a packet to be sent to a user equipment.

20. The first wireless access network node of claim 19, wherein the at least one processor is configured to configure the discard timer to count a specified length of time based on the received delay information, a communication delay over the link, and a buffering delay in the first wireless access network node.

\* \* \* \* \*